US012380569B1

(12) United States Patent
Park et al.

(10) Patent No.: US 12,380,569 B1
(45) Date of Patent: Aug. 5, 2025

(54) LAYOUT EXTRACTION SYSTEM FOR REGIONAL ANNOTATION OF IMAGES

(71) Applicant: Reve AI, Inc., Palo Mill Rd., CA (US)

(72) Inventors: Taesung Park, Palo Alto, CA (US); Michaël Yanis Gharbi, Palo Alto, CA (US)

(73) Assignee: REVE AI, INC., Palo Alto, CA (US)

( * ) Notice: Subject to any disclaimer, the term of this patent is extended or adjusted under 35 U.S.C. 154(b) by 0 days.

(21) Appl. No.: 18/952,835

(22) Filed: Nov. 19, 2024

(51) Int. Cl.
| | |
|---|---|
| *G06T 7/11* | (2017.01) |
| *G06F 40/40* | (2020.01) |
| *G06T 5/70* | (2024.01) |
| *G06T 7/50* | (2017.01) |

(52) U.S. Cl.
CPC ............ *G06T 7/11* (2017.01); *G06F 40/40* (2020.01); *G06T 5/70* (2024.01); *G06T 7/50* (2017.01); *G06T 2210/12* (2013.01)

(58) Field of Classification Search
CPC ... G06F 40/40; G06T 5/70; G06T 7/11; G06T 7/50; G06T 2210/12; G06V 10/25; G06V 10/26; G06V 10/273; G06V 20/41
See application file for complete search history.

(56) References Cited

U.S. PATENT DOCUMENTS

| | | | | |
|---|---|---|---|---|
| 10,019,657 | B2 * | 7/2018 | Lin | G06F 18/24137 |
| 12,141,986 | B2 * | 11/2024 | Marrero | G06V 10/82 |
| 2022/0108455 | A1 * | 4/2022 | Chiu | G06T 7/292 |
| 2024/0378859 | A1 * | 11/2024 | He | G06V 10/774 |

OTHER PUBLICATIONS

Baselizadeh, Soroosh. Occlusion-Ordered Semantic Instance Segmentation. MS thesis. University of Waterloo, 2023. (Year: 2023).*
Wu et al. "Multi-level representation learning with semantic alignment for referring video object segmentation." Proceedings of the IEEE/CVF Conference on Computer Vision and Pattern Recognition. 2022. (Year: 2022).*
Liu et al. "Universal Segmentation at Arbitrary Granularity with Language Instruction." arXiv preprint arXiv:2312.01623 (2023). (Year: 2023).*
Zhang et al. "Monocular object instance segmentation and depth ordering with cnns." Proceedings of the IEEE International Conference on Computer Vision. 2015. (Year: 2015).*
Zhu et al. "Semantic amodal segmentation." Proceedings of the IEEE conference on computer vision and pattern recognition. 2017. (Year: 2017).*

(Continued)

*Primary Examiner* — Katrina R Fujita
(74) *Attorney, Agent, or Firm* — Pillsbury Winthrop Shaw Pittman, LLP

(57) ABSTRACT

A system may access an input image. The system may generate a plurality of segments based on one or more segmentation models and the input image, each segment from among the plurality of segments representing a corresponding salient object. The system may generate a depth map based on a depth estimation model. The system may layer the plurality of segments, based on the depth map and border regions between pairs of segments, to generate a plurality of ordered segments. The system may execute a vision-language model to generate a text annotation of the image based on the plurality of ordered segments.

23 Claims, 9 Drawing Sheets

(56) References Cited

OTHER PUBLICATIONS

Ergül et al. "Depth is all you need: Single-stage weakly supervised semantic segmentation from image-level supervision." 2022 IEEE International Conference on Image Processing (ICIP). IEEE, 2022. (Year: 2022).*

Gungor et al. "Boosting Weakly Supervised Object Detection using Fusion and Priors from Hallucinated Depth." 2024 IEEE/CVF Winter Conference on Applications of Computer Vision (WACV). IEEE, Jan. 2024. (Year: 2024).*

Liang, Zhigan. "Fast Image Segmentation and Animation Generation Algorithm Based on Depth Image Sequence." 2022 2nd International Conference on Networking, Communications and Information Technology (NetCIT). IEEE, 2022. (Year: 2022).*

Yu et al. "Panoptic-Depth Color Map for Combination of Depth and Image Segmentation." arXiv preprint arXiv:2308.12937 (2023). (Year: 2023).*

GitHub—Facebook research—The Repository provides code for running inference with the meta Segment Anything Model 2 (SAM 2), links for downloading the trained model checkpoints, and example notebooks that show how to use the model—downloaded Nov. 19, 2024. https://github.com/facebookresearch/sam2.

Nicolas Carion et al. "End-to-End Object Detection with Transformers", Facebook AI, May 28, 2020, 26 pgs.

Joseph Redmon et al., "You Only Look Once: Unified, Real-Time Object Detection", University of Washington, Allen Institute for AI, Facebook AI Research, May 9, 2016, 10 pgs.

Bin Xiao et al., "Florence-2: Advancing a Unified Representation for a Variety of Vision Tasks", Azure AI, Microsoft, Nov. 10, 2023, 35 pgs.

* cited by examiner

LAYOUT EXTRACTION SYSTEM FOR REGIONAL ANNOTATION OF IMAGES

BACKGROUND

Image analysis and modeling is a field of computer vision that focuses on extracting meaningful information from input images. To extract meaningful images, computer vision systems may rely on various computational techniques as feature extraction, image segmentation, object detection and recognition, and other techniques to analyze images. These and other techniques may be useful in a wide range of fields, from autonomous systems such as automated robotics and self-driving vehicles, medical imaging, surveillance, visual entertainment, remote sensing, and others.

SUMMARY

The disclosure relates to analyzing images, extracting object-based layers from the images and annotating the object-based layers with textual descriptions of the layers. The layers correspond to the editable components of the image, by semantically aligning them to segments of instances, objects, or object parts of the scene. Each layer may be associated with a text description to enable text-guided editing using generative models. The layers also automatically support depth ordering based on occlusion boundaries.

A system may generate textual annotations of object-based layers based on a multi-stage process. The textual annotations may include natural language text. In one stage, the system may detect object instances and salient objects and represent the salient objects as a set of disjoint segments. In another stage, the system may assign depth values to each segment based on occlusion relationships. In another stage, the system may execute a vision-language model used to generate a text annotation for each segment.

BRIEF DESCRIPTION OF THE DRAWINGS

Features of the present disclosure may be illustrated by way of example and not limited in the following figure(s), in which like numerals indicate like elements.

DETAILED DESCRIPTION

Figure 1A:
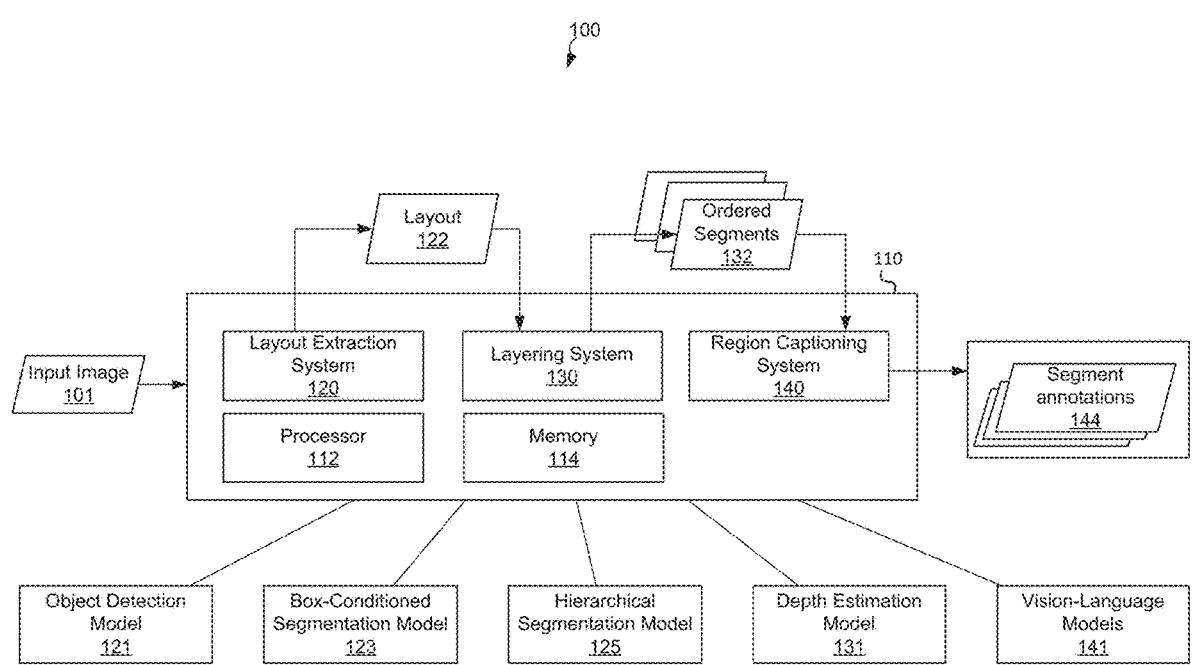
FIG. 1A illustrates an example of a system environment for captioning regions of an image based, according to an implementation.
Figure 1B:
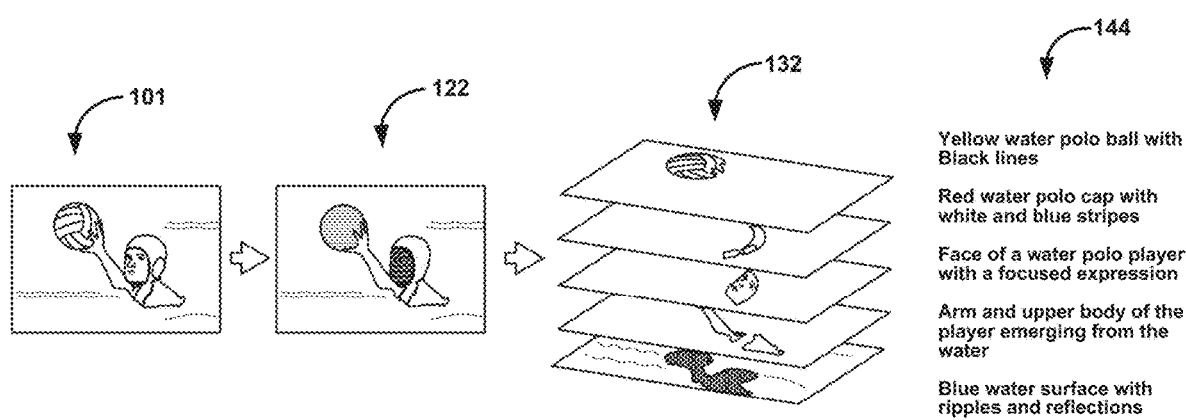
FIG. 1B illustrates an example of outputs in a process of captioning regions of an image, according to an implementation.

FIG. 1A illustrates an example of a system environment 100 for captioning regions of an image based on image and generative models, according to an implementation. The computer system 110 may include a layout extraction system 120, a layering system 130, a region captioning system 140, and/or other features. The computer system 110 may access (such as read, write, delete, and/or update) various databases, such as an annotated images database. The computer system 110 may access an input image 101 and generate one or more segment annotations 144 that describe a respective segment recognized from the input image 101. The input image 101 may be a bitmap or raster image having a grid or other configuration of pixels. In some examples, a vector image may be converted to a bitmap or raster image for image processing described herein. An input image 101 may be a digital photograph, a frame of a video, and/or other digital representation that can be stored as or converted to a bitmap or raster image. An example of an input image 101 is illustrated in FIG. 1B, which illustrates an example of outputs in a process of captioning regions of an image, according to an implementation.

Figure 2:
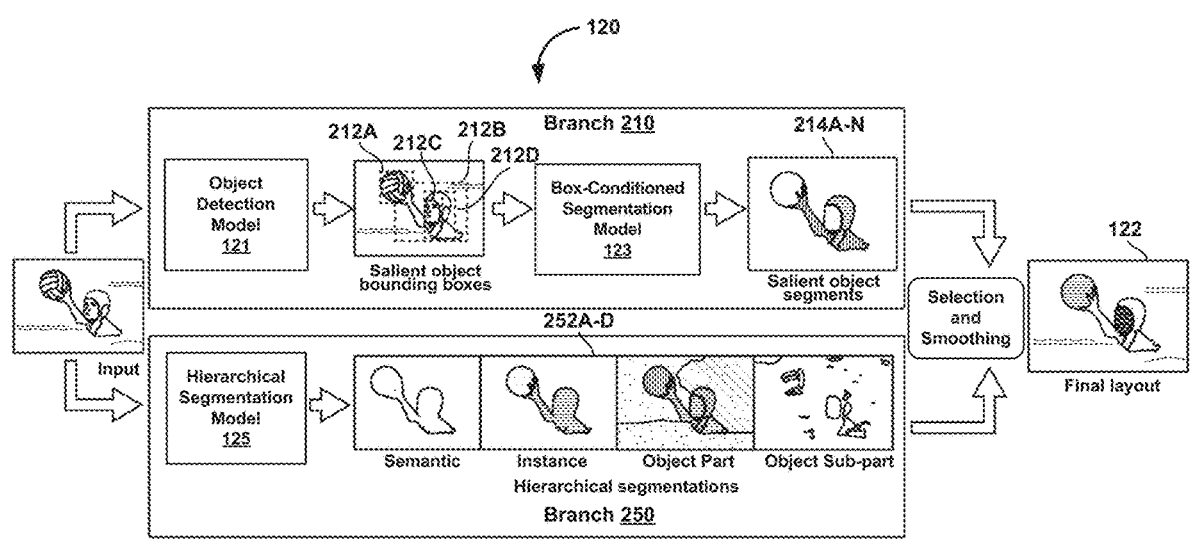
FIG. 2 illustrates a flow diagram of an example process for extracting a layout of an input image to identify image segments.
Figure 3:
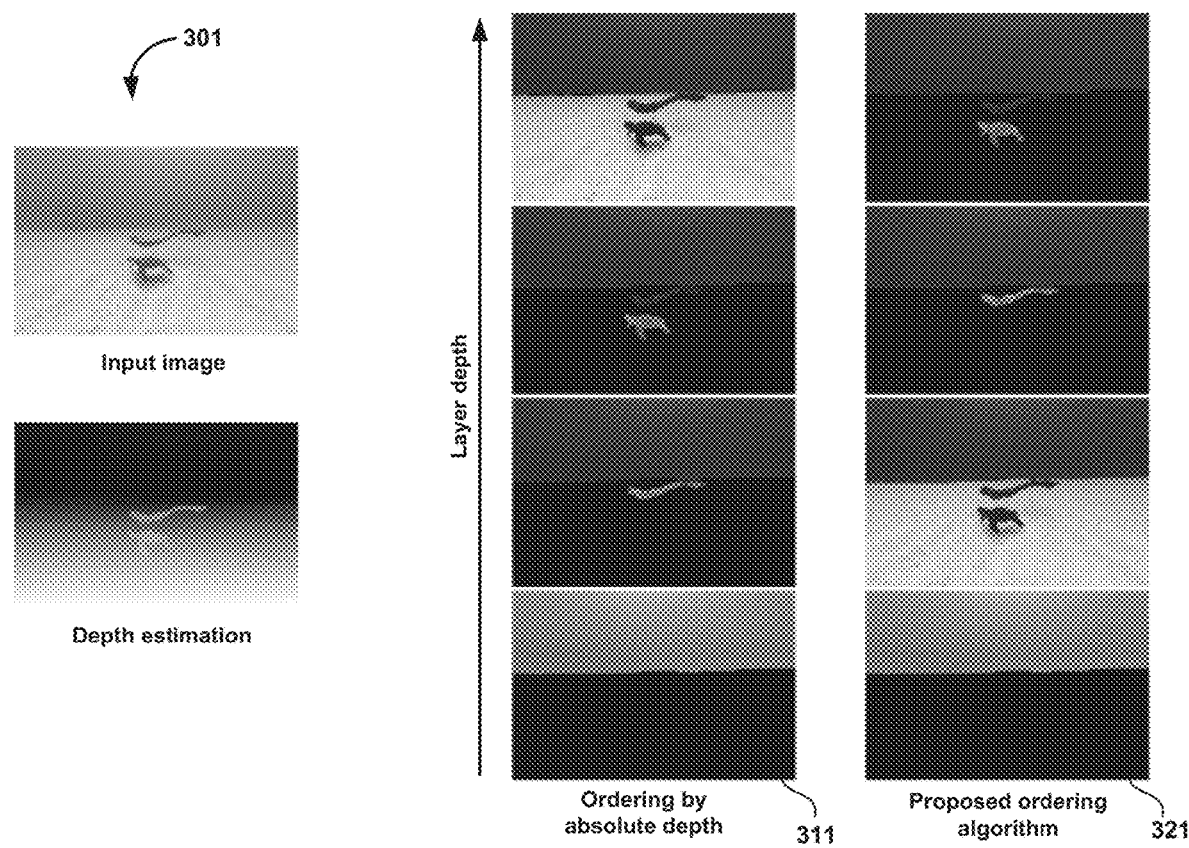
FIG. 3 illustrates an example of layer ordering to generate ordered image segments based on depth estimation.
Figure 4:
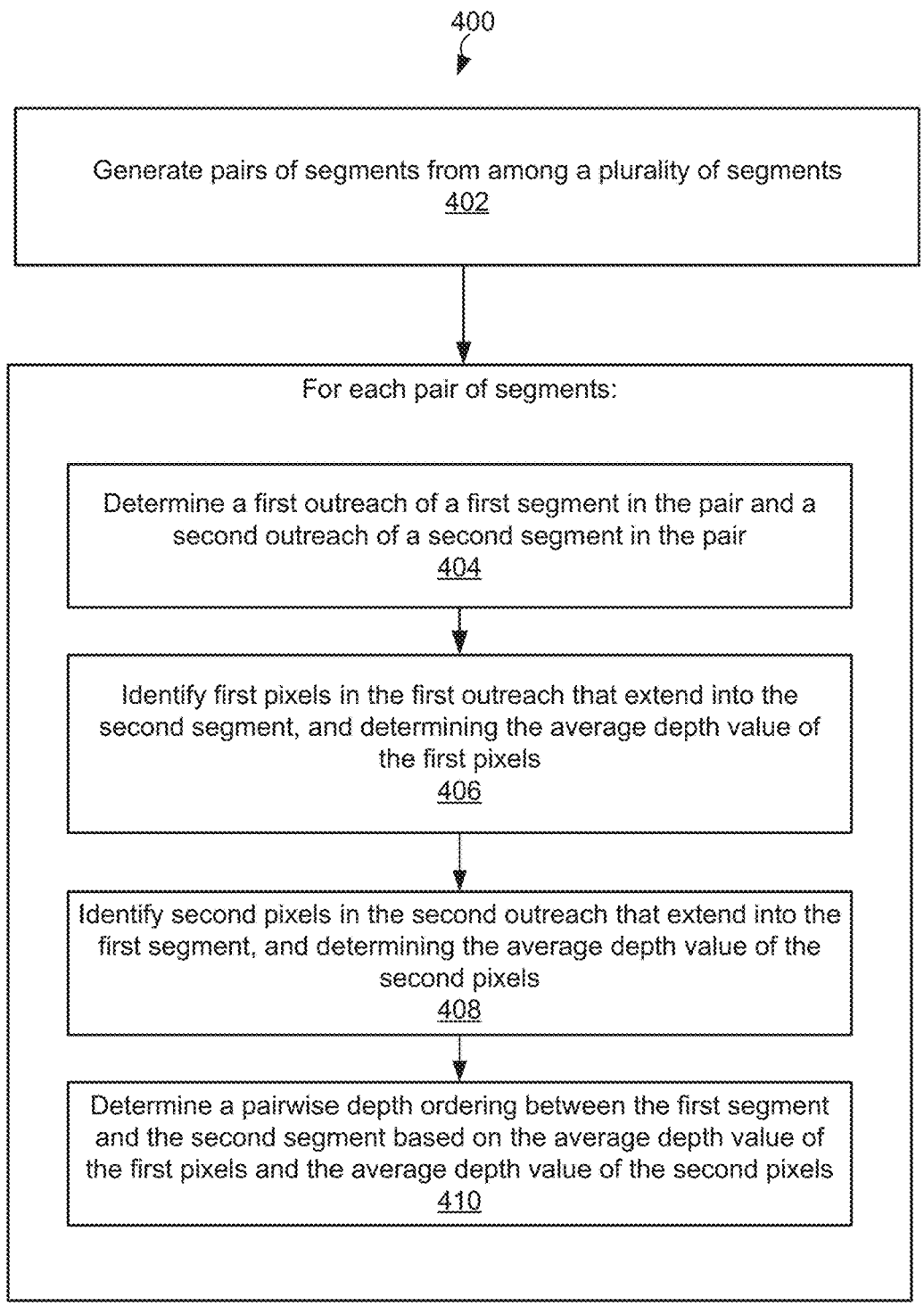
FIG. 4 illustrates an example of a method of determining pairwise relative depth ordering of segments.
Figure 5:
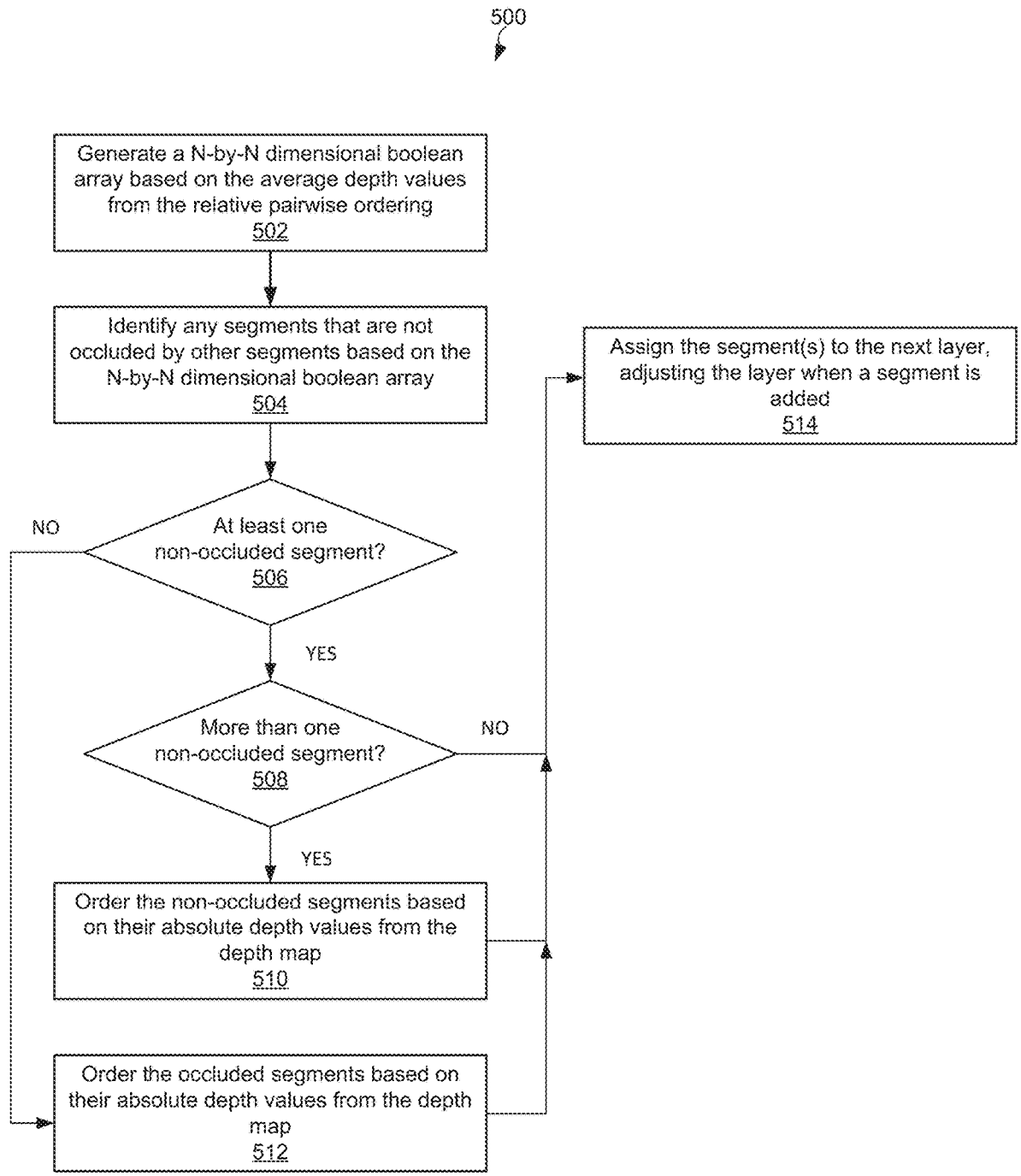
FIG. 5 illustrates an example of a method of globally sorting segments based on the relative pairwise ordering illustrated in FIG. 4.
Figure 6:
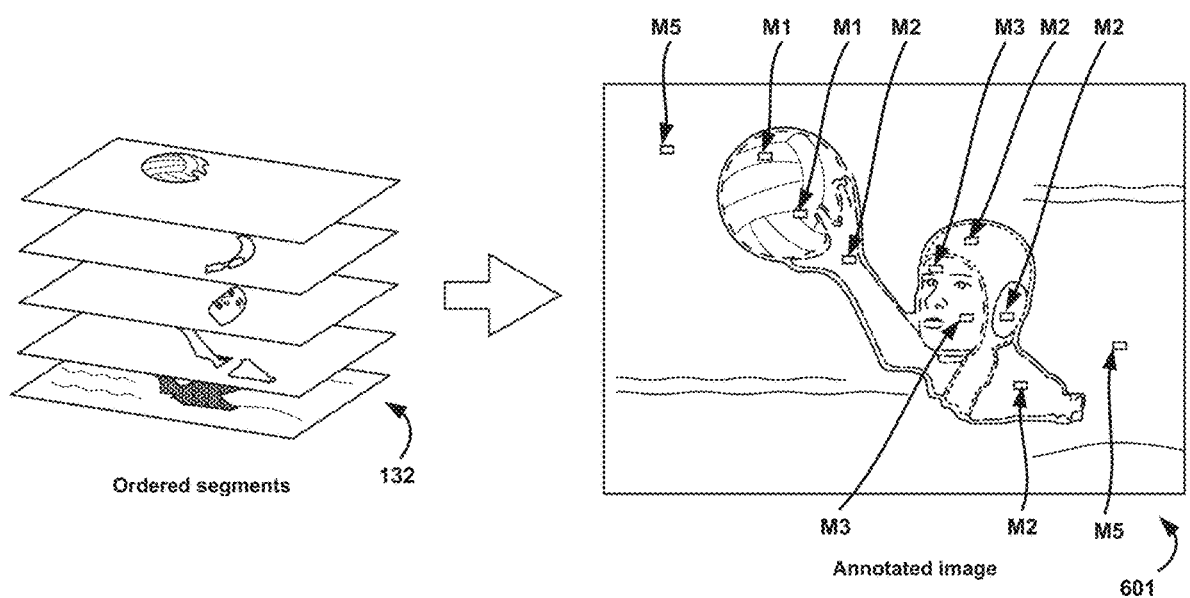
FIG. 6 illustrates an example of annotating an input image for region captioning based on ordered segments.
Figure 7:
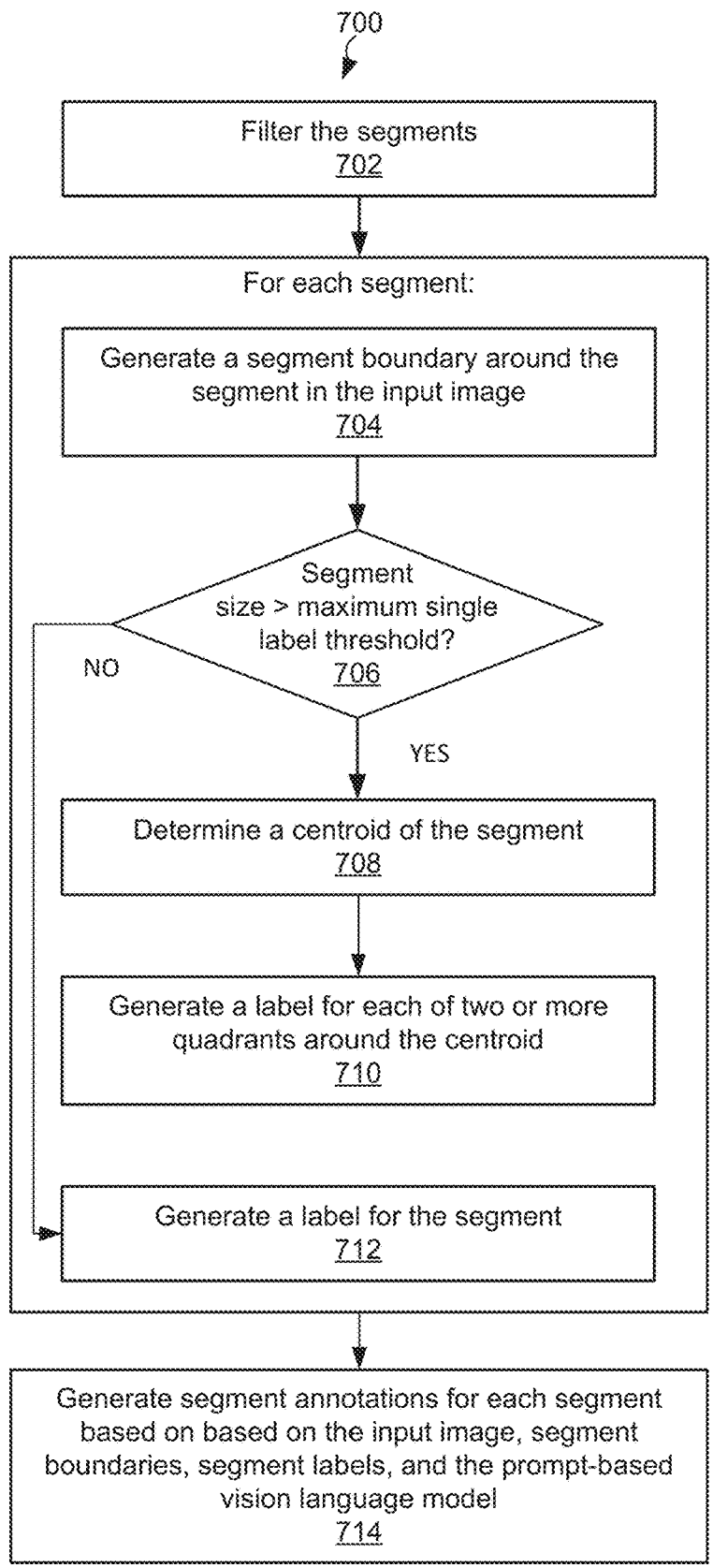
FIG. 7 illustrates an example of a method of region captioning based on ordered segments.

The layout extraction system 120 may generate a layout 122 based on the input image 101 and execution of the object detection model 121, the box-conditioned segmentation model 123, and the hierarchical segmentation model 125. The layout 122 includes a plurality of segments recognized from the input image 101. An example of a layout 122 is illustrated in FIG. 1B. An example of operations of the layout extraction system 120 is illustrated in FIG. 2. The layering system 130 may order (layer) the segments in the layout 122 to generate ordered segments 132 based on execution of a depth estimation model 131 and layering techniques that address problems that can arise using only absolute depth values. These ordered segments 132 represent "object-based layers" that are annotated with textual descriptions, which may include natural language text. Examples of ordered segments 132 are illustrated in FIG. 1B. An example of the operations of the layering system 130 is illustrated in FIGS. 3-5. The region captioning system 140 may caption the segments in the ordered segments 132 with annotations to generate segment annotations 144. A segment annotation 144 is text that describes a corresponding ordered segment 132. The text may include words or phrases. The text may include natural language text. In some examples, a segment annotation 144 is indexed and made searchable. A segment annotation 144 may be stored with or in association with the input image 101. Examples of segment annotations 144 are illustrated in FIG. 1A and Table 3 below. An example of the operations of the region captioning system 140 is illustrated in FIGS. 6-7.

The annotated segments 144 of each input image 101 may be used in various ways. For example, the annotated segments 144 may be stored along and/or in association with the input image 101 in a searchable image database for an image search system. These image search systems may be improved to search the image database based on natural language or other text-based inputs. Furthermore, the image search may be based on semantic understanding of the natural language input and the segment annotations. Other systems such as image editing systems may use the segment annotations of an input image to edit the input image. For example, segments/regions can be removed or modified from the input image. Alternatively or additionally, new or altered images can be added to or in place of segments/regions. For example, an image editing system may be provided with the instruction "replace the polo ball with an umbrella." Those having skill in the art will recognize that other systems may be improved using the disclosures herein.

FIG. 2 illustrates a flow diagram of an example process for extracting a layout of an input image 101 to identify image segments. The process illustrated in the flow diagram may be executed by the layout extraction system 120 illustrated in FIG. 1A. The identified image segments will also be referred to as "layer candidates" because each image segment may become a layer in the image.

The layout extraction system 120 may process the input image 101 based on one or more processing branches that each identify segments in the input image 101 using respective segmentation models. In multi-branch processing implementations, segmentation modeling outputs from each branch may be combined with one another and smoothed to generate a final set of segments in the layout 122. For example, as illustrated, the layout extraction system 120 processes the input image 101 based on branch 210 and branch 250 to produce potential layer candidates, which are then combined and refined to produce the layout 122. It should be noted that only one of these branches may be used instead, and there may be other branches for image segmentations that are combined with either or both illustrated branches.

Object Detection with Region Proposal Network and Box-Conditioned Segmentation

In branch 210, the layout extraction system 120 may generate bounding boxes of salient objects (illustrated as bounding boxes 212A-D) in the input image 101. A salient object in image processing/computer vision is a visually distinctive or important region in an image. For example, a salient object may be a region in the image that stands out from other portions the image. A bounding box of a salient object may be a generally rectangular area of the image that includes most but usually all of the salient object. Thus, each bounding box includes at least one salient object and localizes the salient object in the image. For example, a bounding box may be defined by coordinate positions (such as pixel coordinates in the input image 101) of four corners of the bounding box, which localizes the position of the salient object in the image.

To generate the bounding boxes 212A-D, the layout extraction system 120 may execute an object detection model 121. The object detection model 121 may be trained to identify bounding boxes and objects contained in the bounding boxes. In some implementations, the object detection model 121 uses a neighborhood proposal network that identifies neighborhoods of interest that may include one or more objects of interest and evaluates each neighborhood to generate a confidence metric indicating a likelihood that the neighborhood includes an object of interest. Examples of an object detection model 121 with neighborhood proposal functionality include Faster R-CNN, Feature Pyramid Network, single-stage detectors with neighborhood proposal functionality such as DEtection TRansformer (DETR), You Only Look Once (YOLO), and Florence-2.

In some implementations, the object detection model 121 includes prompt-based functionality for vision and vision-language tasks. In these implementations, the layout extraction system 120 may generate a prompt to generate bounding boxes with salient objects. To illustrate, the layout extraction system 120 may generate a prompt "Analyze the input image and identify all salient objects. For each salient object, generate a bounding box and provide the object class label with a confidence score. Return the result in JSON format with fields 'class', 'confidence', 'x_min', 'y_min', 'x_max', and 'y_max' for each detected object." The outputs 'x_min', 'y_min', 'x_max', and 'y_max' refer to the coordinates of a given bounding box (212A, B, C, or D) for a detected salient object. The layout extraction system 120 may provide the input image 101 and the prompt to the object detection model 121. Responsive to the prompt, the object detection model 121 may identify the bounding boxes 212A-D and generate an output that includes the bounding boxes 212A-D. For example, the object detection model 121 may generate a JSON formatted output that includes the aforementioned fields for each generated bounding box. The particular format and fields are used for illustration and not limitation; other formats and fields may be used as appropriate.

The layout extraction system 120 may generate a plurality of salient object segments 214A-N based on the bounding boxes 212A-D. Each salient object segment 214 identifies a salient object recognized from a corresponding bounding box 212. For example, for each bounding box 212, the layout extraction system 120 may generate a corresponding salient object segment 214 that identifies corresponding salient object. Each salient object segment 214 may include a binary image in which the detected salient object is labeled "1" or other binary indication and the rest of the input image is labeled "0" or other counterpart binary indication.

In particular, the layout extraction system 120 may execute a box-conditioned segmentation model 123, which generates a mask of an image object within the specified bounding box of an image. The box-conditioned segmentation model 123 uses a bounding box 212 as input to guide the segmentation process on the input image 101. This technique may facilitate more precise and efficient segmentation, which may improve segmentation especially when the input image 101 includes complex images or scenes. An example of a box-conditioned segmentation model 123 may include the "Segment Anything 2" model, Mask R-CNN, DETR, or Fully Convolutional Instance Segmentation (FCIS).

To illustrate, for each bounding box 212, the layout extraction system 120 may execute the box-conditioned segmentation model 123 with the input image 103, the coordinates of the bounding box 212, and an instruction to generate a salient image object mask based on the inputs. The box-conditioned segmentation model 123 may output a salient object segment 214, a confidence score indicating a level of confidence that the salient object segment 214 is correct, and a predicted Inference-over-Union (IoU) score. The confidence score may be a measure of the confidence that the output of the box-conditioned segmentation model 123 is correct. The predicted IoU score may be a measure of overlap between the salient object segment 214 and a predicted ground truth of the salient object in the image. In other words, the predicted IoU score may be a prediction of the level of overlap between the salient object segment 214 and the actual salient object if the actual salient object was known. IoU scores are generated based on an area of intersection between the salient object segment 214 and the predicted ground truth for that salient object divided by the total area of both the salient object segment 214 and the predicted ground truth for that salient object.

In some implementations, the box-conditioned segmentation model 123 may be a prompt-based model, in which case the inputs may be provided via prompts. In these implementations, an example of a prompt may include "for the input image, generate a segmentation mask for a salient object within the bounding box ('x_min', 'y_min', 'x_max', and 'y_max')," in which the bounding box coordinates can be obtained from the JSON or other format output of the object detection model 121 and the segmentation mask defines a salient object segment 214 for a salient object.

Mask Filtering

Image segmentation may result in redundant or noisy outputs. For example, some salient objects in an image may be included in more than one bounding box, in which case those bounding boxes may be redundant with one another. These redundancies may introduce errors in object recognition layering and unnecessary computational analysis.

To mitigate these issues, the layout extraction system 120 may perform various filtering operations. For example, the layout extraction system 120 may remove salient object segments 214 having a value of less than a threshold minimum IoU score. The threshold minimum IoU score may be predefined and/or configured. In some examples, the threshold minimum IoU score is 0.75

In another example, the layout extraction system 120 may filter the salient object segments 214A-N to generate a disjoint set of masks. This filtering may include removing duplicate segments, removing overlap in the deduplicated segments, removing segments based on bounding box size, removing small masks, and/or other filtering tasks.

For example, the layout extraction system 120 may use Non-Maximal Suppression (NMS) to reduce the number of overlapping bounding boxes that include the salient object segments 214A-N. In particular, the layout extraction system 120 may sort the salient object segments 214 based on priorities defined by their predicted IOU values. In other implementations, the layout extraction system 120 may sort the salient object segments 214 based on confidence scores. In other implementations, the layout extraction system 120 may sort the salient object segments 214 based on a combination, such as a weighted combination, of the predicted IOU values and confidence scores.

The layout extraction system 120 may identify the top-scoring salient object segment 214 and generate an overlap metric between the top-scoring salient object segment 214 and the next top-scoring salient object segment 214. The overlap metric may be an IoU metric, which may be generated based on the area of intersection (such as area pixel overlap between the top-scoring and next top-scoring salient object segments 214) divided by the area of the union (such as total pixel area). The layout extraction system 120 may evaluate the overlap metric to a threshold value and remove (or retain) the next top-scoring salient object segment 214 based on the evaluation. For example, the layout extraction system 120 may compare the IoU metric between the top-scoring salient object segment 214 and each of the remaining salient object segments 214 against an NMS threshold value. The NMS threshold value may be pre-defined and/or configured as necessary. In some examples, the NMS threshold value can be in the range of 0.8.

If the IoU metric is greater than or equal the NMS threshold value, this means that the salient object segment 214 likely overlaps with the top-scoring salient object segment 214 and may be removed. After the top-scoring salient object segment 214 is compared against the remaining salient object segments 214, the layout extraction system 120 may retain the top-scoring salient object segment 214 and then repeat this process for the next-highest scoring salient object segment 214 that remains until all the salient object segments 214 have been processed.

In some examples, the layout extraction system 120 may constrain mask regions to the input salient bounding boxes 212 to remove unnecessarily large masks that reach outside box conditioning. Remove any overlap in the remaining masks, by iterating through the masks from the largest to the smallest size and subtracting the already occupied regions from the mask.

In some examples, the layout extraction system 120 may remove a salient object segment 214 smaller than a minimum size threshold. For example, the layout extraction system 120 may remove a salient object segment 214 that occupies less than a threshold area, less than a threshold width, less than a threshold height, and/or other minimum size threshold values. In particular, the layout extraction system 120 may remove a salient object segments 214 that have an area of less than 1000 pixels.

In some examples, the layout extraction system 120 may remove overlap in at least some of the masks, by iterating through the masks from larger to smaller size, and subtracting the already occupied pixels or other portions. This process may ensure that each pixel or other portion in the input image 101 may be assigned to a single salient object. The layout extraction system 120 may do so by sorting the salient object segments 214 from largest to smallest based on their area or number of pixels. Beginning with the second largest salient object segment 214, the layout extraction system 120 may determine whether each pixel in the mask exists in any prior salient object segment 214. If so, that pixel may be marked as occupied and removed from the current mask. This process may be repeated until salient object segments 214 have been processed.

Hierarchical Segmentation

In branch 250, the layout extraction system 120 may divide the input image 101 into a grid of subparts, such as a 32×32 grid, which may be regularly spaced. Pixel dimensions other than 32×32 can be used for the subparts depending on the input image 101, resolution, or other factors. For each of the subparts in the grid, the layout extraction system 120 may generate hierarchical segmentations 252 (illustrated as 252A-D). A hierarchical segmentation 252 may be a segment that is identified from the input image 101 at a corresponding level of granularity. For example, the layout extraction system 120 may use a hierarchical segmentation model 125 to generate a semantic segmentation 252A, an instance segmentation 252B, an object part segmentation 252C, and an object sub-part segmentation 252D. The hierarchical segmentation model 125 may be a computer vision model that generates segmentations, including multiple masks for a single input image 101, at different granularities. Examples of the hierarchical segmentation model 125 include the Segment Anywhere-2 and the Semantic Segment Anything Model.

The semantic segmentation 252A classifies pixel in the input image 101 into a predefined semantic class. In particular, the semantic segmentation 252A includes a label assigned to each pixel that indicates an object to which the pixel belongs. The instance segmentation 252B further classifies objects within the same class so that multiple objects of the same class in the input image 101 are individually recognized. The object part segmentation 252C includes an identification of specific parts or components within an object. For instance, in a segmentation of a human figure, object part segmentation might identify the head, torso, arms, legs, and other body parts. The object sub-part segmentation 252D. Object sub-part segmentation may be a more granular level of segmentation that includes sub-components within an object part. For example, within the "hand" part of a human figure, sub-part segmentation may include fingers or other parts of the hand.

The layout extraction system 120 may filter the hierarchical segmentations 252 to remove unreliable segments. For example, prediction results with confidence value, represented by the predicted IoU value from the hierarchical segmentation model 125 lower than respective threshold values are removed. In particular, predicted IoU values lower than 0.9 for the semantic segmentation 252A, instance segmentation 252B, and object part segmentation 252C are removed; and predicted IoU values lower than 0.8 for the object sub-part segmentation 252D are removed. Other respective threshold values may be predefined and/or configured as needed.

In some examples, layout extraction system 120 may remove prediction results with low stability value, represented by the amount of IoU change in the segmentation mask when the threshold for the masking changes. The stability thresholds are set identical to the confidence thresholds or may vary depending on particular needs.

In some examples, the layout extraction system 120 may remove overlapping masks by retaining only the masks with less than 0.2 IoU with any other masks in the same granularity. Between overlapping segments, the one with higher confidence value may be kept.

In some examples, the layout extraction system 120 may remove masks that occupy less than a minimum mask threshold area, width, length or other minimum size parameter. For example, the layout extraction system 120 may remove masks having an area less than 256 pixels.

The masks in each hierarchical level of segmentation are not necessarily disjoint (though they may be). Thus, the layout extraction system 120 may iterate through the masks from the largest to the smallest confidence and subtract already occupied regions. This iteration may be similar to the manner in which filtering may be performed in branch 210 to identify disjoint segments and ensure that a given pixel is included in only a single object.

Selection and Smoothing

As shown, five segmentation results are illustrated in FIG. 2: (1) the salient object segments 214 (from branch 210) and (2)-(5) the hierarchical segmentations 252A-D (from branch 250). The layout extraction system 120 may combine these segmentations to form the final segmentation for the final layout 122.

The layout extraction system 120 may order the segment groups in the order of salient object segments 214, instance segmentation 252B, semantic segmentation 252A, object part segmentation 252C, and object sub-part segmentation 252D. Within each group, the layout extraction system 120 orders the segments by their size, from largest to smallest. The layout extraction system 120 may then add segment masks one by one. For example, the layout extraction system 120 may retain all salient object segments 214. For the masks in the hierarchical segmentations 252A-D, the layout extraction system 120 may apply the following filters:

If the mask intersects with existing masks more than a threshold overlap percentage (such as 50%) of its size, drop the mask.

If the disjoint mask size is smaller than a threshold minimum percentage (such as 0.2%) of the whole image, drop the mask.

After filtering, the layout extraction system 120 may apply smoothing to the masks to remove holes or islands in the segmentation. The layout extraction system 120 may apply both morphological opening and closing on each segment, using the kernel size that is adaptively decided as $0.025\sqrt{s}$, where s is the area size of the mask. Morphological opening removes small objects (noise) from the foreground, while morphological closing fills in holes in the foreground. The size of the kernel used for opening and closing may be based on the size of the mask to be able to process masks having different sizes. Smoothing may include various techniques, including averaging, blurring, median filtering, and bilateral filtering. In averaging, each pixel's value may be replaced by the average of its neighboring pixels. Different weights may be assigned to neighboring pixels based on their distance from the center pixel. For example, closer pixels might have higher weights. In Gaussian blurring, a Gaussian kernel may be applied to the image, in which the weights of neighboring pixels follow a Gaussian distribution. This results in a smoother blur. In median filtering, each pixel may be replaced with the median value of its neighboring pixels. This is effective at removing noise while preserving edges. In bilateral filtering, spatial filtering may be combined with range filtering based on intensity differences, which may preserve edges.

FIG. 3 illustrates an example of layer ordering to generate ordered image segments based on depth estimation. Depth ordering may be a computational process in which layers of an image are ordered according to estimated depths of the layers such that top level layers occlude lower level layers. The estimated depth may be indicated by a depth value. Objects with higher depth values are deeper in the image and are placed behind objects with lower depth values. However, depth ordering based on absolute depth estimates can be misleading based on photographing artifacts, or the way images are taken.

To illustrate, FIG. 3 shows an input image 301 (which is an example of an input image 101 illustrated in FIGS. 1A and 1B) of a diver swimming with a sea turtle. The input image 301 may be segmented into four layers: the ocean floor, ocean water, the diver, and the turtle. An intuitive depth ordering should have the foreground objects, the diver and the turtle, in front of (on top of or otherwise occluding) the background layer. However, using ordering by absolute depth 311, because the ocean floor stretches toward the camera at the bottom of the image, the ocean may be assigned with the smallest average depth value, making the ocean floor layer in front of all the other layers using an absolute depth estimate, even though it is a background layer. For example, a depth value using absolute depth estimates will consider the location of pixels of an object relative to a "camera" or other imaging device that generated the image. Using absolute depth estimates, the ocean floor will appear to be the closest object and therefore be a foreground object rather than a background object. This is because the ocean floor object has pixels that are close to the camera, resulting in a small depth value.

The layering system 130 may mitigate these or other depth estimation problems. For example, layering system 130 may execute a depth estimation model 131 on the input image 301 to generate a depth map. The depth map may include, for each pixel in the input image 301, an estimated distance of the pixel from a reference point, such as the camera position. In some examples, the depth estimation model 131 may take as input the segments in the layout 122 identified by the layout extraction system 120 (such as via branches 210 and 250) to layer the segments in the depth map.

To layer the segments in the layout 122, the layering system 130 compares only the depth values near the border between the segments rather than using absolute depth values. This mitigates the effect of absolute depth estimates described above. For example, the depth value of a segment representing the ocean floor illustrated in FIG. 3 will be based on its border with other segments such as the diver and turtle. Since the depth value of the ocean floor is deeper than the foreground objects, for example, it gets correctly placed behind the diver and the turtle as shown at the depth ordering 321.

To do so, for each pair of adjacent segments, the layering system 130 determines the occlusion ordering by comparing the average depth value in the border region between the two segments, which is defined as the region outside the mask that gets included by a morphological dilation. Considering the depth value near the boundary of the two segments has been discovered to result in superior layer ordering than z-ordering based on the average depth of the whole segments, as shown in FIG. 3.

Pairwise Depth Ordering

FIG. 4 illustrates an example of a method 400 of determining pairwise relative depth ordering of segments. At 402, the method 400 may include generating pairs of segments from among a plurality of segments. The plurality of segments may be the segments in the layout 122 generated by the layout extraction system 120. The pairs of segments may be all combinations of pairs of segments drawn from the plurality of segments. For example, the number of pairs of segments may be equal to $N!/(2!*(N-2)!)$.

For each pair of segments, the method 400 may include operations 404-410.

At 404, the method 400 may include determining a first outreach of a first segment in the pair and a second outreach of a second segment in the pair. An outreach may be a region or area that extends beyond the original area or boundary of a segment. An outreach may be determined by determining a dilation, which is an expansion of the segment's boundary, and subtracting the original segment from the dilation. Thus, the first outreach may be a region or area that extends beyond the original area or boundary of the first segment and the second outreach may be a region or area that extends beyond the original area or boundary of the second segment.

At 406, the method 400 may include identifying first pixels in the first outreach that extend into the second segment, and determining the average depth value of the first pixels. The depth value of each pixel in the first pixels may be obtained from the depth map generated by the depth estimation model 131.

At 408, the method 400 may include identifying second pixels in the second outreach that extend into the first segment, and determining the average depth value of the second pixels. The depth value of each pixel in the second pixels may also be obtained from the depth map generated by the depth estimation model 131.

At 410, the method 400 may include determining a pairwise depth ordering between the first segment and the second segment based on the average depth value of the first pixels (from 406) and the average depth value of the second pixels (from 408).

After all combinations of pairs of segments are processed, the method 400 completes and returns the relative pairwise depth ordering of each pair of segments.

Global Topological Sorting

The layering system 130 may globally sort the layers of segments based on the relative pairwise depth ordering described in FIG. 4. The goal of the global sort is to prioritize layers of segments that are not occluded by another layer without violating the relative pairwise ordering. In other words, the global sort identifies which layers of segments should be placed on top of others without placing a given segment in the global order in a way that may be inconsistent with its placement relative to another segment in the relative pairwise ordering. The top-most layer is the one that is not occluded by any other layer and subsequent layers are those that are successively occluded by more layers. In the case of a tie, such as when two or more layers of segments are not occluded, then the layering system 130 may select the layer having the lowest absolute depth value from the depth map (or otherwise whichever absolute depth value indicates is on top). The layering system 130 may determine whether a layer is occluded based on the relative pairwise ordering.

FIG. 5 illustrates an example of a method 500 of globally sorting segments based on the relative pairwise ordering illustrated in FIG. 4. The method 500 may be implemented or otherwise executed by the layering system 130.

At 502, the method 500 may include generating an N-by-N dimensional boolean array based on the relative pairwise ordering, in which N is the number of segments (such as the number of the plurality of segments in the layout 122). The N-by-N dimensional boolean array represents the relative pairwise ordering. In particular, the N-by-N dimensional boolean array may be a matrix in which each segment has a counterpart segment from a relative pairwise ordering and the value in the matrix may be based on the average depth values for the pair determined at 406 and 408.

At 504, the method 500 may include identifying any segments that are not occluded by other segments based on the N-by-N dimensional boolean matrix. In some examples, a boolean value for a pair may indicate which member of the pair is to be in a higher layer. For example, the method 500 may include identifying segments in the N-by-N dimensional boolean matrix having a zero or negative depth difference value (such as based on the average depth values determined at 406 and 408) with respect to a counterpart segment in the N-by-N dimensional boolean array. Such segments are occluded by the counterpart segment.

At 506, the method 500 may include determining whether there is at least one non-occluded segment (a segment that is not occluded by another segment). If so, then at 508, the method 500 may include determining whether there are more than one (two or more) non-occluded segments. If so, then at 510, the method 500 may include ordering the non-occluded segments based on their respective absolute depth values from the depth map and then proceeding to 514. At 514, the method 500 may include assigning the non-occluded segments to the next highest layer and incrementing the layer according to the sorted segments. This layer numbering is not absolute as some systems will have a lower layer number for segments that appear on top (as illustrated in this example) or a higher layer number for segments that appear on top (not illustrated in this example).

Returning to 506, if there is not at least one non-occluded segment, then at 512, the method 500 may include ordering the occluded segments based on their respective absolute depth values and proceeding to 514.

Returning to 508, if there are not multiple non-occluded segments (only one non-occluded segment exists), then the method 500 may proceed to 514, in which case the single non-occluded segment may be processed. The result of the method 500 is the ordered segments 132 in which the salient objects are layered.

Table 1. Illustrates an example of pseudocode for the global topological sorting illustrated at FIG. 5. In cases in which the global sort results in a tie between two or more segments, the absolute depth values for these segments from the depth map may be used as a tiebreaker.

---

N: the number of segments
|abs_depth|: N-dimensional array representing the absolute depth values
N segments
|rel_depth_diff|: N-by-N dimensional boolean array representin
the pairwise relative depth ordering.

-continued

```
selected_indices = [ ]
remaining_indices = arange(N)
while True:
# Consider the depth values of the remaining indices
cur_rel_depth_diff = rel_depth_diff[
remaining_indices[:, None], remaining_indices[None, :]]
cur_abs_depth = abs_depth[remaining_indices]
# Consider all nodes that are not occluded by any other remain
candidates = th.nonzero(th.all(cur_rel_depth_diff <= 0.0, dim=
if candidates.numel( ) == 0:
# if there is no unoccluded nodes, just pick the highest ab
selected_index = remaining_indices[th.argmax(cur_abs_depth)
selected_indices.append(selected_index)
else:
# among the unoccluded nodes, pick the one with the highest
selected_abs_depth = cur_abs_depth[candidates]
candidate_with_highest_depth = candidates[th.argmax(selecte
selected_index = remaining_indices[candidate_with_highest_d
selected_indices.append(selected_index)
remaining_indices = remaining_indices[remaining_indices != sel
if remaining_indices.numel( ) == 0:
break
```

Region Captioning

The region captioning system 140 may generate segment annotations 144 based on the ordered segments 132. For example, the region captioning system 140 may generate a segment annotation 144 for each respective ordered segment 132 where each ordered segment 132 contains a respective segment from the layout 122. In particular, the region captioning system 140 may execute a vision-language model 141 to generate the segment annotations 144. The vision-language model 141 may include GPT-4o, CLAUDE, SONNET, GEMINI, and/or other vision-language model.

FIG. 6 illustrates an example of annotating an input image 101 for region captioning based on ordered segments 132. Region capturing may take as input the ordered segments 132 and generate a segment annotation 144 for each ordered segment 132. The result may be an image having segment annotations 144 for at least one of the identified segments in the input image 101. The region captioning system 140 may annotate the input image 101 by drawing boundaries around each of the ordered segments 132 and labeling each segment with segment labels from smallest to largest depth values (as illustrated, the labels are M1-M5, although other numbers of labels may be used depending on the number of segments to be annotated and other types of labels other than alphanumeric labels may be used). The region captioning system 140 draw the boundaries based on the boundaries of each segment determined by the layout extraction system 120.

FIG. 7 illustrates an example of a method 700 of region captioning based on ordered segments 132. At 702, the method 700 may include filtering the segments 132 based on a minimum size threshold value, which may be predefined and/or configured. Segments 132 below this threshold values will be removed from consideration.

For each segment 132 ordered according to their respective order in the ordered segments 132, the method 700 may include executing 704-712. At 704, the method 700 may include generating a segment boundary around the segment in the input image 101. For example, the boundary coordinates for each segment 132 may be obtained from the layout extraction system 120 that generated the layout 122. These boundary coordinates may be used to draw boundaries corresponding to each segment. In some examples, the boundaries may be color-coded.

At 706, the method 700 may include determining whether the size of the segment is greater than a maximum single label threshold. The maximum single label threshold may be predefined and/or configured. In one example, the maximum single label threshold is in the range of 10000 pixels. The maximum single label threshold may be configured as an area, length, width, or other size threshold value.

If the size of the segment is not greater than the maximum single label threshold, at 712, the method 700 may generate a label for the segment. The label may be alphanumeric, numeric, or other identifier that uniquely identifies each segment. As illustrated in FIG. 6, the labels are "M1" through "M5."

Returning to 706, if the size of the segment is greater than the maximum single label threshold, at 708, the method 700 may include determining a centroid of the segment. A centroid is a geometric center of a shape, such as a segment. At 710, the method 700 may include generating a label for each of two or more quadrants around the centroid. For example, 710 may include generating a label at the upper left quadrant around the centroid and generating the same label for the segment at the lower right quadrant around the centroid. Other numbers of labels may be used for larger segments.

The output of the method 700 may be an annotated image, such as the annotated image 601 illustrated in FIG. 6. The annotated image 601 may include text describing at least one of the identified layers. For example, the region captioning system 140 may generate one or more segment annotations 144 for the input image 101 by executing a vision-language model 141. For example, the region captioning system 140 may generate one or more prompts for input to the vision-language model 141 along with the annotated image with an instruction to generate the segment annotations 144.

Table 2 shows examples of prompts for illustration.

System Message: I am a professional, highly sought-after, and extremely detail-oriented image analyst.
User Message: This image is segmented into M regions. Each region is labeled M1, M2, M3, etc.) in ascending order from foreground to background with the color of the label corresponding to the color of the segmentation outline. Two identically colored, noncontiguous regions with the same label are likely being occluded by another region closer to the foreground. These noncontiguous regions should be thought of as part of the same labeled region.
Imagine that this image was generated by a diffusion model capable of localized prompting, and that an artist created it by drawing individual regions, then prompting those regions to generate the pixels inside them. Your task is to reverse- engineer the prompts that the artist used to generate each region.
While you may consider the entire image for context, each prompt must only describe the contents of the region to which it refers (including noncontiguous regions), never mentioning adjacent content. Prompts should always be definitive; avoid terms such as "may be," "appears to be," and "possibly" (since that's not how the artist would have composed her prompts).
When you encounter text, describe its properties in detail, but do not include the text itself.

It's crucial that your prompts are as accurate as possible, and that you respond only with a well-formed JSON object which maps regions to their respective descriptions (no introduction, code block markers, Markdown, etc.). Use the template below:
{
"M1": "A detailed but isolated description of the region labeled M1.",
"M2": "A detailed but isolated description of the region labeled M2.",
"M3": "A detailed but isolated description of the region labeled M3."
...
}

Table 3 shows an example of an output of the vision-language model 141, as prompted by the prompts in Table 2 along with the annotated image. The output in Table 3 includes five segments M1-M5 each with a corresponding segment annotation 144, which is illustrated as text following a segment identifier (M1-M5) and a colon. For example, the segment annotation for the segment M1 may be "Yellow water polo ball with black markings", the segment annotation for the segment M2 may be "Red water polo cap with white and blue stripes", the segment annotation for the segment M3 may be "Face of a water polo player with a focused expression", the segment annotation for the segment M4 may be "Arm and upper body of the player emerging from the water, holding the ball", and the segment annotation for the segment M5 may be "Blue water surface with ripples and reflections." The annotated segments may be stored along or in association with the input image 101. In some examples, the input image 101 and one or more segment annotations may be referred to as an "annotated image."

In some examples, one or more of the annotated segments may be indexed. In some examples, the text of one or more of the annotated segments may be searched to identify the input image 101 and/or to identify a one or more corresponding segments M1, M2, M3, M4, and M5. For example, if the text for annotated segment M1 is stored in association with the input image 101, then a search of "find images that have a water polo ball" may return the input image 101. Alternatively, or additionally, a search of "find a layer that includes a water polo ball" may return the segment M1. In these examples, the entire input image 101 may be identified and/or returned as a search result in response to a query. Alternatively, or additionally, one or more relevant segments M1-M5 (the actual masks or layers) may be identified and/or returned as a search result in response to a query.

example, generating the plurality of segments may include executing branch 210 and/or 250 to generate the layout 122, as illustrated in FIG. 2.

At 806, the method 800 may include generating a depth map based on a depth estimation model (such as the depth estimation model 131) that determines a depth value for each pixel in the input image. At 808, the method 800 may include layering the plurality of segments based on the depth map and border regions between pairs of segments to generate a plurality of ordered segments (such as the ordered segments 132). The layering may be performed as described with respect to the layering system 130 and/or FIGS. 3-5.

At 810, the method 800 may include executing a vision-language model (such as the vision-language model 141) to generate a text annotation of the image based on the plurality of ordered segments. The text annotations may include one or more of the segment annotations 144 generated as described with respect to FIGS. 6 and/or 7.

The processor 112 may include one or more of a digital processor, an analog processor, a digital circuit designed to process information, an analog circuit designed to process information, a state machine, and/or other mechanisms for electronically processing information. Although processor 112 is shown in FIG. 1A as a single entity, this is for illustrative purposes only. In some implementations, processor 112 may comprise a plurality of processing units. These processing units may be physically located within the same device, or processor 112 may represent processing functionality of a plurality of devices operating in coordination. Some or all processing units may be on-site within a computational facility and/or be located remotely such as at a cloud-based computing facility. The memory 114 may include read-only memory (ROM) or flash memory (neither shown), and random-access memory (RAM) (not shown). It should be appreciated that the RAM may be the main {
"M1": "Yellow water polo ball with black markings",
"M2": "Red water polo cap with white and blue stripes",
"M3": "Face of a water polo player with a focused expression",
"M4": "Arm and upper body of the player emerging from the water, holding the ball",
"M5": "Blue water surface with ripples and reflections"
}

Figure 8:
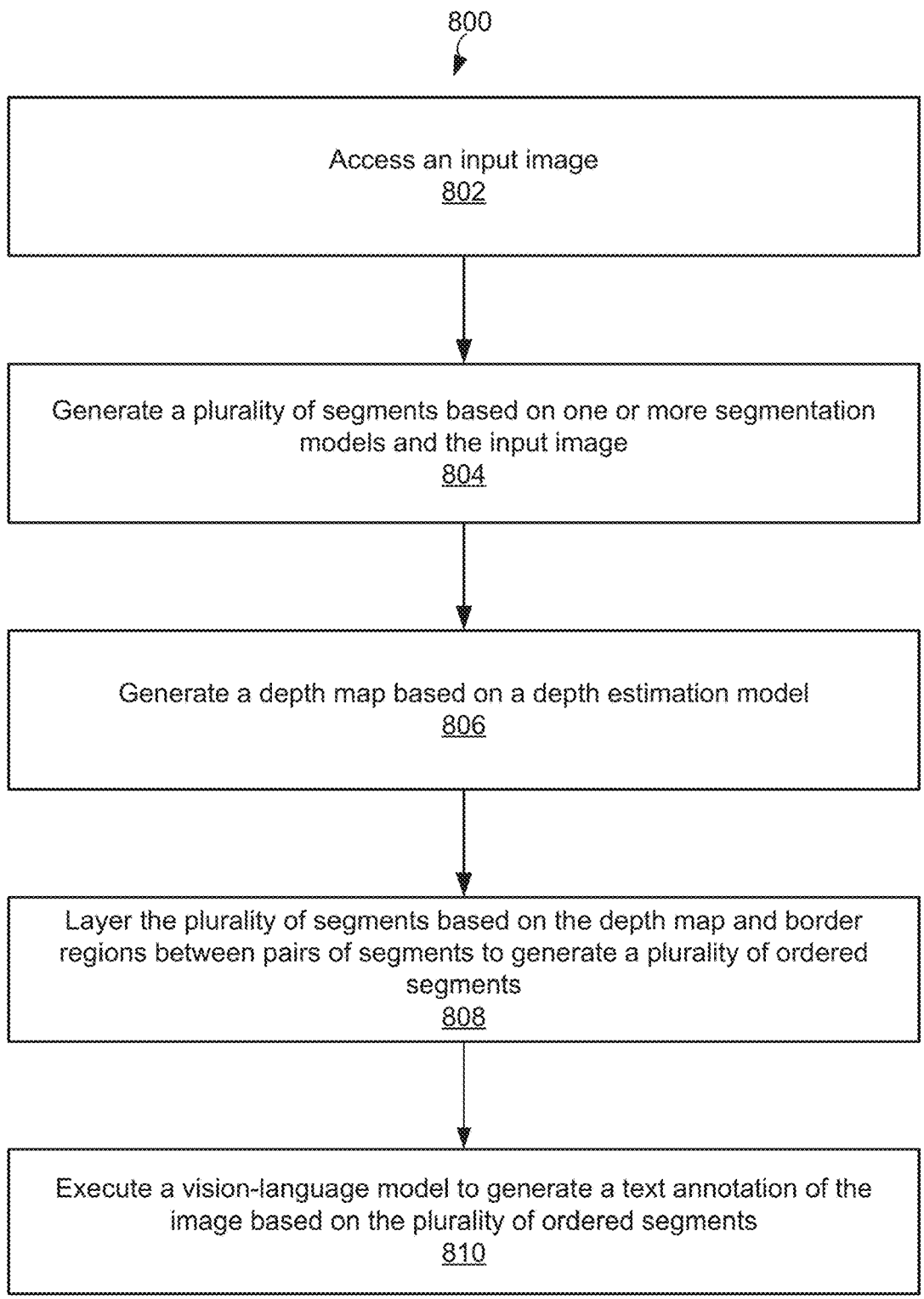
FIG. 8 illustrates an example of a method for captioning regions of an input image.

FIG. 8 illustrates an example of a method 800 for captioning regions of an input image based on image and generative models. FIG. 8 will be described with references to prior Figures for clarity. At 802, the method 800 may include accessing an input image (such as input image 101). At 804, the method 800 may include generating a plurality of segments based on one or more segmentation models and the input image, each segment from among the plurality of segments representing a corresponding salient object. For memory into which an operating system and various application programs may be loaded. The ROM or flash memory may contain, among other code, the Basic Input-Output system (BIOS) which controls basic hardware operation such as the interaction with one or more peripheral components.

The computer system 110 may train, retrain, fine-tune, execute, or otherwise activate the various computer models 121, 123, 125, 131, and 141. At least some of these models are generative AI models. A generative AI model may be a computer model that may be trained to generate new content based on training data. Each of the systems 120, 130, and 140 may call or otherwise use one or more of the other systems.

In some aspects, the techniques described herein relate to a system, including: a processor programmed to: access an input image; generate a plurality of segments based on one or more segmentation models and the input image, each segment from among the plurality of segments representing a corresponding salient object; generate a depth map based on a depth estimation model; layer the plurality of segments, based on the depth map and border regions between pairs of segments, to generate a plurality of ordered segments; and execute a vision-language model to generate a text annotation of the image based on the plurality of ordered segments.

In some aspects, the techniques described herein relate to a system, wherein to generate the plurality of segments, the processor is further programmed to: generate a first set of segments in a first processing branch including first segmentation modeling; generate a second set of segments in a second processing branch including second segmentation modeling different from the first segmentation modeling; and determine a final set of segments based on the first set of segments and the second set of segments.

In some aspects, the techniques described herein relate to a system, wherein to generate the first set of segments, the processor is further programmed to: execute an object detection model to generate a plurality of bounding boxes, each bounding box from among the plurality of bounding boxes including a respective salient object in the input image detected by the object detection model; execute a box-conditioned segmentation model based on the plurality of bounding boxes, wherein the box-conditioned segmentation model identifies, for each bounding box from among the plurality of bounding boxes, a corresponding salient object; and generate, as an output of the box-conditioned segmentation model, a plurality of salient object segments.

In some aspects, the techniques described herein relate to a system, wherein the processor is further programmed to: identify overlapping bounding boxes in the first set of segments based on a Non-Maximal Suppression threshold value; and filter the overlapping bounding boxes.

In some aspects, the techniques described herein relate to a system, wherein to generate the second set of segments, the processor is further programmed to: execute a hierarchical segmentation model that generates a plurality of hierarchical segmentations; and filter the plurality of hierarchical segmentations to generate the second set of segments.

In some aspects, the techniques described herein relate to a system, wherein the plurality of hierarchical segmentations include at least one of: a semantic segmentation, an instance segmentation, an object part segmentation, and an object sub-part segmentation.

In some aspects, the techniques described herein relate to a system, wherein the processor is further programmed to: combine and apply smoothing to the first set of segments and the second set of segments to generate the plurality of segments.

In some aspects, the techniques described herein relate to a system, wherein to layer the plurality of segments, the processor is further programmed to: generate a pairwise depth ordering of the plurality of segments that considers only the border region between each pair of segments and provides a relative ordering of segments in each pair with respect to one another; and perform global topological sorting based on the pairwise depth ordering, wherein the respective depth value of each is based on the global topological sorting.

In some aspects, the techniques described herein relate to a system, wherein to generate the pairwise depth ordering, the processor is programmed to: generate pairs of segments from among the plurality of segments; for each pair of segments: determine a first outreach of a first segment in the pair and a second outreach of a second segment in the pair; identify first pixels in the first outreach that extend into the second segment, and determining the average depth value of the first pixels; determine a pairwise depth ordering between the first segment and the second segment based on the average depth value of the first pixels.

In some aspects, the techniques described herein relate to a system, wherein to perform the global topological sorting, the processor is further programmed to: generate an N-by-N matrix dimensional boolean matrix based on the pairwise depth ordering; identify non-occluded segments and occluded segments based on the N-by-N matrix dimensional boolean matrix; and layer the non-occluded segments before the occluded segments.

In some aspects, the techniques described herein relate to a method, including: accessing, by a processor, an input image; generating, by the processor, a plurality of segments based on one or more segmentation models and the input image, each segment from among the plurality of segments representing a corresponding salient object; generating, by the processor, a depth map based on a depth estimation model; layering, by the processor, the plurality of segments based on the depth map and border regions between pairs of segments to generate a plurality of ordered segments; and executing, by the processor, a vision-language model to generate a text annotation of the image based on the plurality of ordered segments.

In some aspects, the techniques described herein relate to a method, wherein generating the plurality of segments includes: generating a first set of segments in a first processing branch including first segmentation modeling; generating a second set of segments in a second processing branch including second segmentation modeling different from the first segmentation modeling; and determining a final set of segments based on the first set of segments and the second set of segments.

In some aspects, the techniques described herein relate to a method, wherein generating the first set of segments includes: executing an object detection model to generate a plurality of bounding boxes, each bounding box from among the plurality of bounding boxes including a respective salient object in the input image detected by the object detection model; executing a box-conditioned segmentation model based on the plurality of bounding boxes, wherein the box-conditioned segmentation model identifies, for each bounding box from among the plurality of bounding boxes, a corresponding salient object; and generating, as an output of the box-conditioned segmentation model, a plurality of salient object segments.

In some aspects, the techniques described herein relate to a method, further including: identifying overlapping bounding boxes in the first set of segments based on a Non-Maximal Suppression threshold value; and filtering the overlapping bounding boxes.

In some aspects, the techniques described herein relate to a method, wherein generating the second set of segments includes: executing a hierarchical segmentation model that generates a plurality of hierarchical segmentations; and filtering the plurality of hierarchical segmentations to generate the second set of segments.

In some aspects, the techniques described herein relate to a method, wherein the plurality of hierarchical segmentations include at least one of: a semantic segmentation, an instance segmentation, an object part segmentation, and an object sub-part segmentation.

In some aspects, the techniques described herein relate to a method, further including: combining and applying smoothing to the first set of segments and the second set of segments to generate the plurality of segments.

In some aspects, the techniques described herein relate to a method, wherein layering the plurality of segments includes: generating a pairwise depth ordering of the plurality of segments that considers only the border region between each pair of segments and provides a relative ordering of segments in each pair with respect to one another; and performing global topological sorting based on the pairwise depth ordering, wherein the respective depth value of each is based on the global topological sorting.

In some aspects, the techniques described herein relate to a non-transitory computer readable medium storing instructions that, when executed on a processor, programs the processor to: access an input image; generate a plurality of segments based on one or more segmentation models and the input image, each segment from among the plurality of segments representing a corresponding salient object; generate a depth map based on a depth estimation model; layer the plurality of segments, based on the depth map and border regions between pairs of segments, to generate a plurality of ordered segments; and execute a vision-language model to generate a text annotation of the image based on the plurality of ordered segments.

In some aspects, the techniques described herein relate to a non-transitory computer readable medium, wherein to generate the plurality of segments, the instructions further program the processor to: generate a first set of segments in a first processing branch including first segmentation modeling; generate a second set of segments in a second processing branch including second segmentation modeling different from the first segmentation modeling; and determine a final set of segments based on the first set of segments and the second set of segments.

The computer system 110 may access a model API endpoint, which may be an API that provides an interface to one or more of the models. The system may activate a model via the model API endpoint. For example, to activate a model, the computer system 110 may generate or select a prompt via a prompt generator and transmit the prompt as input via the model API endpoint. The prompt generator may be a system component that receives an input and generates a prompt for execution by one or more of the models. For example, the region captioning system 140 may use the prompt generator to generate a prompt for the vision-language model 141. A prompt may be an instruction to a generative AI model to generate an output. The prompt may include a query to be answered and/or a description of the output to be generated. In some instances, the prompt may also include additional information to be used by the model to generate a response. The additional information may include contextual data, desired output formats, constraints, domain-specific knowledge, examples, templates, tone, style, localization information (such as output language, consideration of cultural information, and so forth), and/or other information that may be provided to the model to help shape its response. Thus, generation of the prompt itself can be an important factor in obtaining an appropriate response from one or more of the generative AI models.

Prompts can be in the form of a text prompt for models that can understand text inputs, machine prompts for models that can understand non-text such as vector inputs, and/or other types of prompts depending on the model for which the prompt is intended.

In some instances, the prompt generator may access one or more preconfigured prompts that may be designed by a developer and/or historical prompts previously generated by one or more users. In these instances, the prompt generator may provide a user-selectable listing of the preconfigured prompts. Preconfigured prompts may be advantageous in situations in which a prompt is found to be effective and can be re-used by the same or different users and/or to simplify and streamline prompts. In some instances, the prompt generator may modify a preconfigured prompt for dynamic prompt generation based on the preconfigured prompt.

To obtain an input image 101 (if accessed from a network, for example), the computer system 110 may use a system API to provide upload capabilities for client devices. This data upload or access may be made via Java Database Connectivity (JDBC), Representational state transfer (RESTful) services, Simple Mail Transfer Protocol (SMTP) protocols, direct file upload, and/or other file transfer services or techniques. In particular, the system API may include a MICROSOFT SHAREPOINT API Connector, an Hyper Text Transfer Protocol (HTTP)/HTTP-secure (HTTPS), a Network Drive Connector, a File Transfer Protocol (FTP) Connector, SMTP Artifact Collector, Object Store Connector, MICROSOFT ONEDRIVE Connector, GOOGLE DRIVE Connector, DROPBOX Connector, and/or other types of connector interfaces.

The computer system 110 may be connected to one other devices or services via a communication network (not illustrated), such as the Internet or the Internet in combination with various other networks, like local area networks, cellular networks, or personal area networks, internal organizational networks, and/or other networks. It should be noted that the computer system 110 may transmit data, via the communication network, conveying the predictions one or more client devices. The data conveying the predictions may be a user interface generated for display at the one or more client devices, one or more messages transmitted to the one or more client devices, and/or other types of data for transmission. Although not shown, the one or more client devices may each include one or more processors.

Processor 112 may be programmed to execute one or more computer program components. The computer program components may include software programs and/or algorithms coded and/or otherwise embedded in the processor 112. The one or more computer program components or features may include various subsystems such as 120, 130, 140, and/or other components.

Processor 112 may be configured to execute or implement 120, 130, and 140 by software; hardware; firmware; some combination of software, hardware, and/or firmware; and/or other mechanisms for configuring processing capabilities on processor 112. It should be appreciated that although 120, 130, and 140 are illustrated in FIG. 1A as being co-located in the computer system 110, one or more of the components or features 120, 130, and 140 may be located remotely from the other components or features. The description of the functionality provided by the different components or features 120, 130, and 140 described below is for illustrative purposes, and is not intended to be limiting, as any of the components or features 120, 130, and 140 may provide more or less functionality than is described, which is not to imply that other descriptions are limiting. For example, one or more of the components or features 120, 130, and 140 may be eliminated, and some or all of its functionality may be provided by others of the components or features 120, 130, and 140, again which is not to imply that other descriptions are limiting. As another example, processor 112 may include one or more additional components that may perform some or all of the functionality attributed below to one of the components or features 120, 130, and 140.

The computer system 110 may also include memory in the form of electronic storage. The electronic storage may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionalities described herein.

The databases and data stores described herein may be, include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

The systems and processes are not limited to the specific implementations described herein. In addition, components of each system and each process can be practiced independent and separate from other components and processes described herein. Each component and process also can be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by one or more of the system features illustrated in the Figures.

This written description uses examples to disclose the embodiments, including the best mode, and to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
    a processor programmed to:
        access an input image;
        generate a plurality of segments based on one or more segmentation models and the input image, each segment from among the plurality of segments representing a corresponding salient object;
        generate a depth map based on a depth estimation model that estimates a distance between a reference point in the input image with respect to one or more pixels in the input image;
        layer the plurality of segments, based on the depth map and border regions between pairs of segments, to generate a plurality of ordered segments; and
        execute a vision-language model to generate a text annotation of the image based on the plurality of ordered segments.

2. The system of claim 1, wherein to generate the plurality of segments, the processor is further programmed to:
    generate a first set of segments in a first processing branch comprising first segmentation modeling;
    generate a second set of segments in a second processing branch comprising second segmentation modeling different from the first segmentation modeling; and
    determine a final set of segments based on the first set of segments and the second set of segments.

3. The system of claim 2, wherein to generate the first set of segments, the processor is further programmed to:
    execute an object detection model to generate a plurality of bounding boxes, each bounding box from among the plurality of bounding boxes comprising a respective salient object in the input image detected by the object detection model;
    execute a box-conditioned segmentation model based on the plurality of bounding boxes, wherein the box-conditioned segmentation model identifies, for each bounding box from among the plurality of bounding boxes, a corresponding salient object; and
    generate, as an output of the box-conditioned segmentation model, a plurality of salient object segments.

4. The system of claim 2, wherein the processor is further programmed to:
    identify overlapping bounding boxes in the first set of segments based on a Non-Maximal Suppression threshold value; and
    filter the overlapping bounding boxes.

5. The system of claim 2, wherein to generate the second set of segments, the processor is further programmed to:
    execute a hierarchical segmentation model that generates a plurality of hierarchical segmentations; and
    filter the plurality of hierarchical segmentations to generate the second set of segments.

6. The system of claim 5, wherein the plurality of hierarchical segmentations include at least one of: a semantic segmentation, an instance segmentation, an object part segmentation, and an object sub-part segmentation.

7. The system of claim 2, wherein the processor is further programmed to:
    combine and apply smoothing to the first set of segments and the second set of segments to generate the plurality of segments.

8. The system of claim 1, wherein to layer the plurality of segments, the processor is further programmed to:
generate a pairwise depth ordering of the plurality of segments that considers only the border region between each pair of segments and provides a relative ordering of segments in each pair with respect to one another; and
perform global topological sorting based on the pairwise depth ordering, wherein the respective depth value of each segment is based on the global topological sorting.

9. The system of claim 8, wherein to generate the pairwise depth ordering, the processor is programmed to:
generate pairs of segments from among the plurality of segments;
for each pair of segments:
determine a first outreach of a first segment in the pair and a second outreach of a second segment in the pair;
identify first pixels in the first outreach that extend into the second segment, and determining the average depth value of the first pixels;
determine a pairwise depth ordering between the first segment and the second segment based on the average depth value of the first pixels.

10. The system of claim 8, wherein to perform the global topological sorting, the processor is further programmed to:
generate an N-by-N matrix dimensional boolean matrix based on the pairwise depth ordering;
identify non-occluded segments and occluded segments based on the N-by-N matrix dimensional boolean matrix; and
layer the non-occluded segments before the occluded segments.

11. A method, comprising:
accessing, by a processor, an input image;
generating, by the processor, a plurality of segments based on one or more segmentation models and the input image, each segment from among the plurality of segments representing a corresponding salient object;
generating, by the processor, a depth map based on a depth estimation model that estimates a distance between a reference point in the input image with respect to one or more pixels in the input image;
layering, by the processor, the plurality of segments based on the depth map and border regions between pairs of segments to generate a plurality of ordered segments; and
executing, by the processor, a vision-language model to generate a text annotation of the image based on the plurality of ordered segments.

12. The method of claim 11, wherein generating the plurality of segments comprises:
generating a first set of segments in a first processing branch comprising first segmentation modeling;
generating a second set of segments in a second processing branch comprising second segmentation modeling different from the first segmentation modeling; and
determining a final set of segments based on the first set of segments and the second set of segments.

13. The method of claim 12, wherein generating the first set of segments comprises:
executing an object detection model to generate a plurality of bounding boxes, each bounding box from among the plurality of bounding boxes comprising a respective salient object in the input image detected by the object detection model;
executing a box-conditioned segmentation model based on the plurality of bounding boxes, wherein the box-conditioned segmentation model identifies, for each bounding box from among the plurality of bounding boxes, a corresponding salient object; and
generating, as an output of the box-conditioned segmentation model, a plurality of salient object segments.

14. The method of claim 12, further comprising:
identifying overlapping bounding boxes in the first set of segments based on a Non-Maximal Suppression threshold value; and
filtering the overlapping bounding boxes.

15. The method of claim 12, wherein generating the second set of segments comprises:
executing a hierarchical segmentation model that generates a plurality of hierarchical segmentations; and
filtering the plurality of hierarchical segmentations to generate the second set of segments.

16. The method of claim 15, wherein the plurality of hierarchical segmentations include at least one of: a semantic segmentation, an instance segmentation, an object part segmentation, and an object sub-part segmentation.

17. The method of claim 12, further comprising:
combining and applying smoothing to the first set of segments and the second set of segments to generate the plurality of segments.

18. The method of claim 11, wherein layering the plurality of segments comprises:
generating a pairwise depth ordering of the plurality of segments that considers only the border region between each pair of segments and provides a relative ordering of segments in each pair with respect to one another; and
performing global topological sorting based on the pairwise depth ordering, wherein the respective depth value of each segment is based on the global topological sorting.

19. A non-transitory computer readable medium storing instructions that, when executed on a processor, programs the processor to:
access an input image;
generate a plurality of segments based on one or more segmentation models and the input image, each segment from among the plurality of segments representing a corresponding salient object;
generate a depth map based on a depth estimation model that estimates a distance between a reference point in the input image with respect to one or more pixels in the input image;
layer the plurality of segments, based on the depth map and border regions between pairs of segments, to generate a plurality of ordered segments; and
execute a vision-language model to generate a text annotation of the image based on the plurality of ordered segments.

20. The non-transitory computer readable medium of claim 19, wherein to generate the plurality of segments, the instructions further program the processor to:
generate a first set of segments in a first processing branch comprising first segmentation modeling;
generate a second set of segments in a second processing branch comprising second segmentation modeling different from the first segmentation modeling; and
determine a final set of segments based on the first set of segments and the second set of segments.

21. A system, comprising:
a processor programmed to:
- access an input image;
- generate a plurality of segments based on one or more segmentation models and the input image, each segment from among the plurality of segments representing a corresponding salient object;
- generate a depth map based on a depth estimation model;
- layer the plurality of segments, based on the depth map and border regions between pairs of segments, to generate a plurality of ordered segments, wherein to layer the plurality of segments, the processor is programmed to:
  - generate a pairwise depth ordering of the plurality of segments that considers only the border region between each pair of segments and provides a relative ordering of segments in each pair with respect to one another; and
  - perform global topological sorting based on the pairwise depth ordering, wherein the respective depth value of each is based on the global topological sorting; and
- execute a vision-language model to generate a text annotation of the image based on the plurality of ordered segments.

22. The system of claim 21, wherein to generate the pairwise depth ordering, the processor is programmed to:
- generate pairs of segments from among the plurality of segments;
- for each pair of segments:
  - determine a first outreach of a first segment in the pair and a second outreach of a second segment in the pair;
  - identify first pixels in the first outreach that extend into the second segment, and determining the average depth value of the first pixels;
  - determine a pairwise depth ordering between the first segment and the second segment based on the average depth value of the first pixels.

23. The system of claim 21, wherein to perform the global topological sorting, the processor is further programmed to:
- generate an N-by-N matrix dimensional boolean matrix based on the pairwise depth ordering;
- identify non-occluded segments and occluded segments based on the N-by-N matrix dimensional boolean matrix; and
- layer the non-occluded segments before the occluded segments.

* * * * *